UNITED STATES PATENT OFFICE.

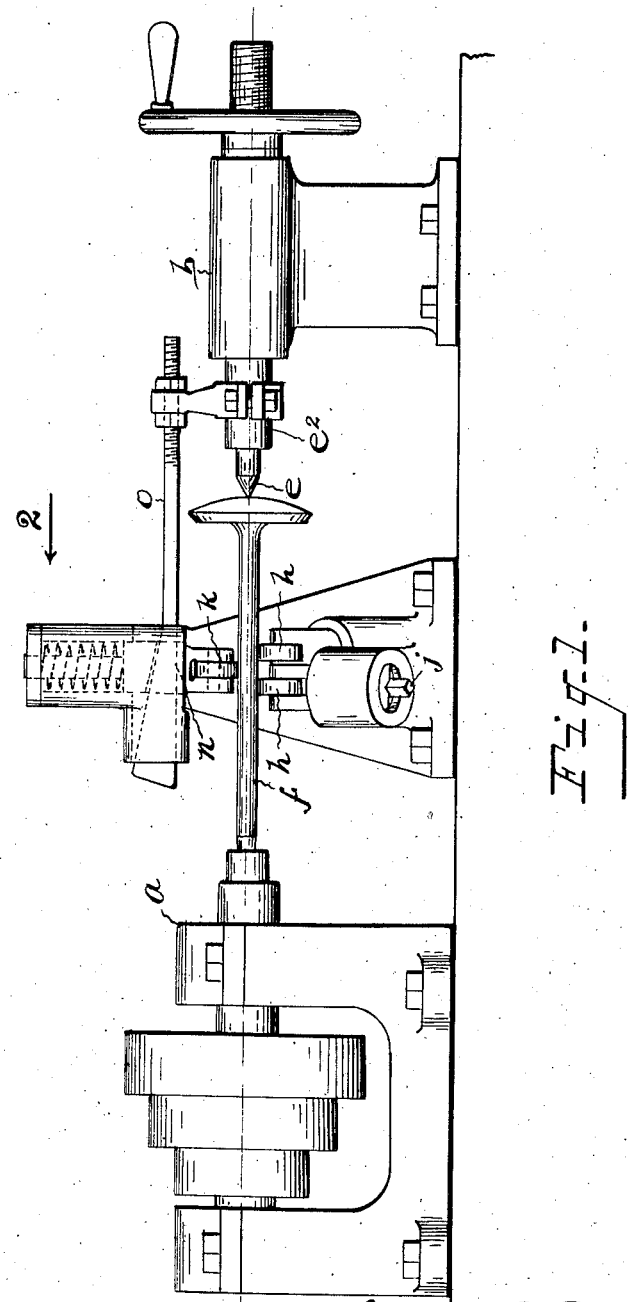

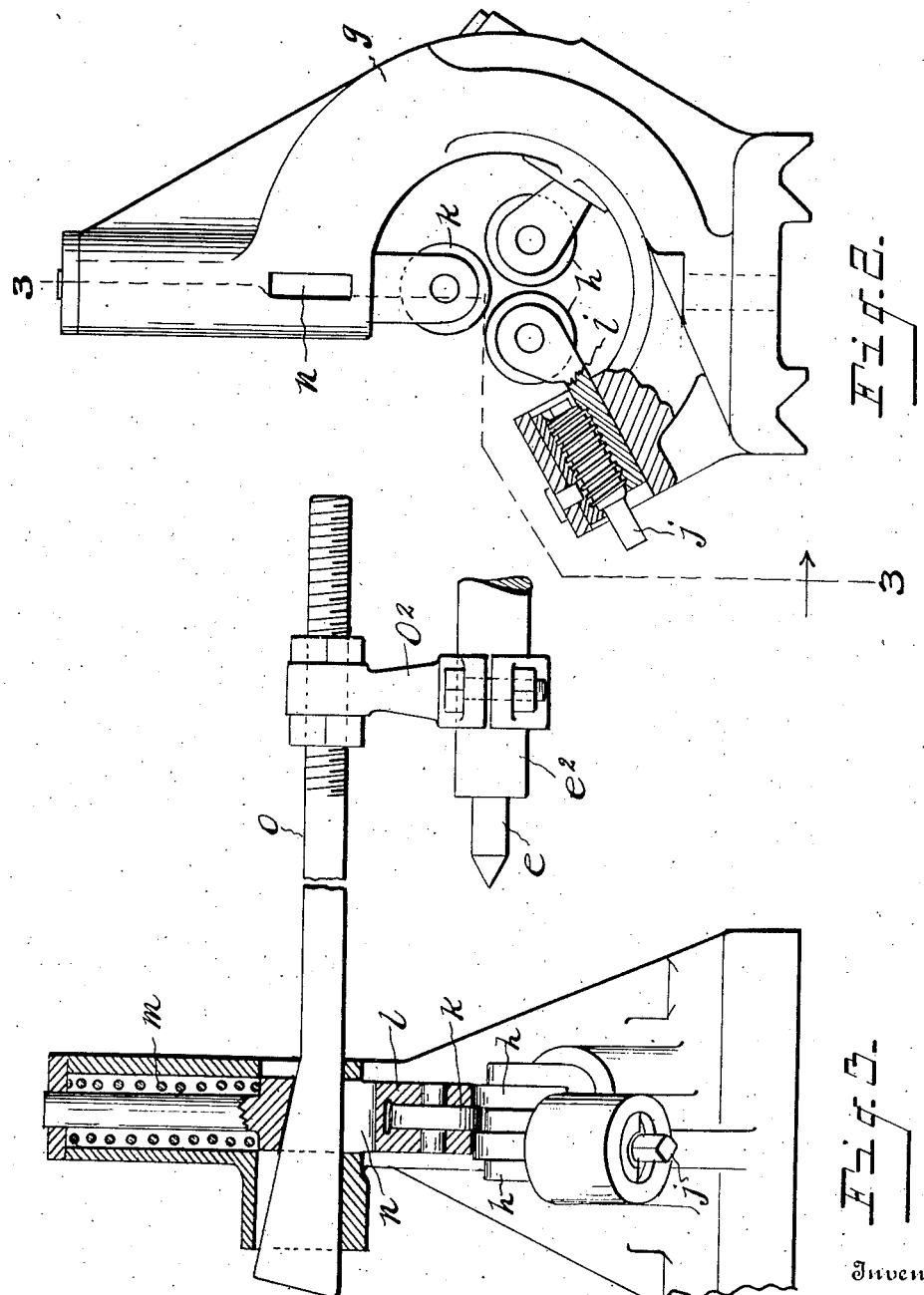

WILLIAM A. BLACKBURN, OF DETROIT, MICHIGAN.

WORK-REST.

1,401,131.     Specification of Letters Patent.     Patented Dec. 27, 1921.

Application filed May 24, 1920. Serial No. 383,773.

*To all whom it may concern:*

Be it known that I, WILLIAM A. BLACKBURN, citizen of the United States, residing at Detroit, county of Wayne, State of Michigan, have invented a certain new and useful Improvement in Work-Rests, and declare the following to be a full, clear, and exact description of the same, such as will enable others skilled in the art to which it pertains to make and use the same, reference being had to the accompanying drawings, which form a part of this specification.

My invention relates to a work rest for use in conjunction with a lathe provided with means whereby coincident with the engagement of the work by the lathe centers, it will likewise be automatically centered and gripped by the mechanism of the rest.

In the drawings,—

Figure 1 is an elevation showing my device attached to a lathe.

Fig. 2 is an elevation of the work rest partly broken away.

Fig. 3 is an elevation, partly in section, taken on the line 3—3, Fig. 2.

Let $a$ represent the head stock and $b$, the tail stock of a lathe. $e$ is the cone end of the movable lathe center carried by the tail-spindle $e^2$. This part $e^2$ might be a tool holder, the cutting end of the tool being indicated as $e$. A piece of work is indicated as $f$, such for instance as a valve. The work rest is shown more in detail in Figs. 2 and 3. It is constructed along somewhat conventional lines comprising as it does a standard $g$ built to overhang the work and provided with adjustable supporting means in the form of a pair of rollers $h$ carried by separate halves of a pair of split nuts, indicated as $i$. An adjusting screw $j$ is provided adapted to reciprocate the halves of the split nuts which carry the rollers so as to adjust such rollers to support the work desired to be received thereon in the position required.

These rollers are placed at an angle to each other so as to form a seat for the work, as shown, and this structure is conventional practice.

I provide a gripping member or plunger to center the work on this support and secure the same in such centered position. This gripping member or plunger comprises a third roller pivotally carried by the plunger $l$, which plunger is held yieldingly downward toward the support and the work resting thereon by means of a coiled spring $m$. The plunger $l$ is slotted at $n$ to receive a draw-bar $o$ which is carried by the movable lathe spindle $e^2$ in longitudinal alinement therewith by means of a bracket $o^2$ fixedly mounted on such spindle. It will be seen that the draw-bar is adapted for adjustment as to extension from the supporting bracket by means of adjusting nuts. This draw-bar is provided at its outer extremity with an inclined head, the inclined edge of which engages the end of the slot $n$ of the plunger to elevate the plunger against the resistance of the spring $m$ when the draw-bar is withdrawn therethrough. The movement of the drawbar, it is apparent, will be equal to and in the same direction as the movement of the spindle $e^2$.

In the operation of the device the work is placed on the work support and the lathe center is moved against the end thereof. This actuates the draw-bar and the plunger under pressure of the spring is forced downward, centering the work on the rest and holding it in position. When the lathe center or tool is withdrawn from the work, the draw-bar is likewise moved in a like direction, elevating the plunger $l$ against the resistance of the spring and releasing the work.

What I claim is:

1. In a work rest, in combination with the tail piece of a lathe, an adjustable support for a piece of work, a gripping member adapted to hold the work against said support, means carried by said tail piece adapted to coöperate with said gripping member so as to elevate the same from the work coincident with the withdrawal of the tail piece.

2. In a work rest, in combination with the tail spindle of a lathe, a support for a piece of work, an opposed member adapted to yieldingly hold said work against said support, but adapted to be withdrawn therefrom, means carried by the tail spindle adapted to co-act with said opposed member so as to withdraw the same from the work coincident with the withdrawal of the tail spindle.

3. In a device of the class described, in combination, a movable lathe center, a work rest adapted to grip a piece of work, means for actuating said work rest to release the work carried thereby automatically with the withdrawal of the movable lathe center from the work.

4. In a work rest, in combination with a movable lathe center, a standard provided with a support for a piece of work, a gripping member adapted to clamp the work against said support, said gripping member provided with means for being held yieldingly toward said support, means carried by said movable lathe center adapted to co-act with the gripping member so as to withdraw the same from the support upon withdrawal of the movable center from the work.

5. In a work rest, in combination with a movable center, in a lathe, a standard provided with a support for a piece of work, a gripping member carried by said standard provided with means for being held yieldingly against such work positioned on said support, such gripping member slotted to receive a draw-bar, a draw-bar carried by said movable lathe center, provided with an inclined head and passing through the slot in said gripping member in such a manner that when the movable lathe center is withdrawn the draw bar will be actuated, the inclined head thereof co-acting with the end of the slot in the gripping member to withdraw the same.

6. In a work rest, in combination with a movable lathe center, a standard provided with a support for a piece of work, a plunger carried by such standard positioned above such work support provided with means for being held yieldingly toward such support, means carried by said lathe center adapted to co-act with said plunger to elevate the same coincident with the withdrawal of the lathe center.

7. In a work rest, the combination with a movable lathe center, a standard provided with a support for a piece of work, a slotted plunger disposed within a recess in said standard positioned above said work support provided with means for being held yieldingly downward thereagainst, a draw-bar provided with an inclined head carried by the movable lathe spindle relatively longitudinally adjustable thereof and adapted for movement therewith, the inclined head of said draw-bar passing through the slot of said plunger in such a manner that the inclined edge thereof co-acts with the plunger to elevate the same coincident with the withdrawal of the draw-bar therethrough.

8. In a device of the class described, in combination, a movable lathe center, a work rest adapted to grip a piece of work, means automatically operable by the movement of said movable lathe center adapted to actuate said gripping work rest in such a manner as to release the work carried thereby co-incident with the withdrawal of the movable lathe center.

In testimony whereof, I sign this specification.

WILLIAM A. BLACKBURN.